No. 699,257. Patented May 6, 1902.
J. STOUT.
COMBINED HARROW AND ROLLER.
(Application filed Jan. 24, 1901.)
(No Model.) 2 Sheets—Sheet 2.
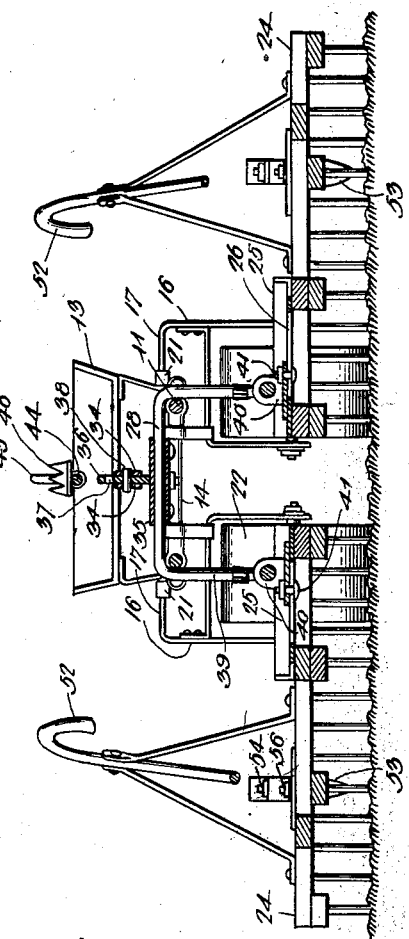
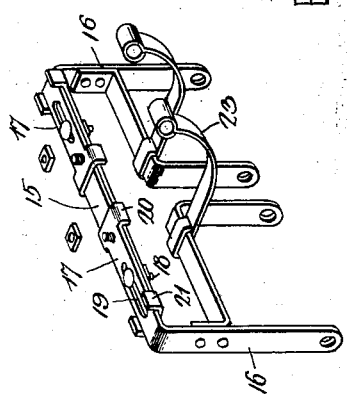
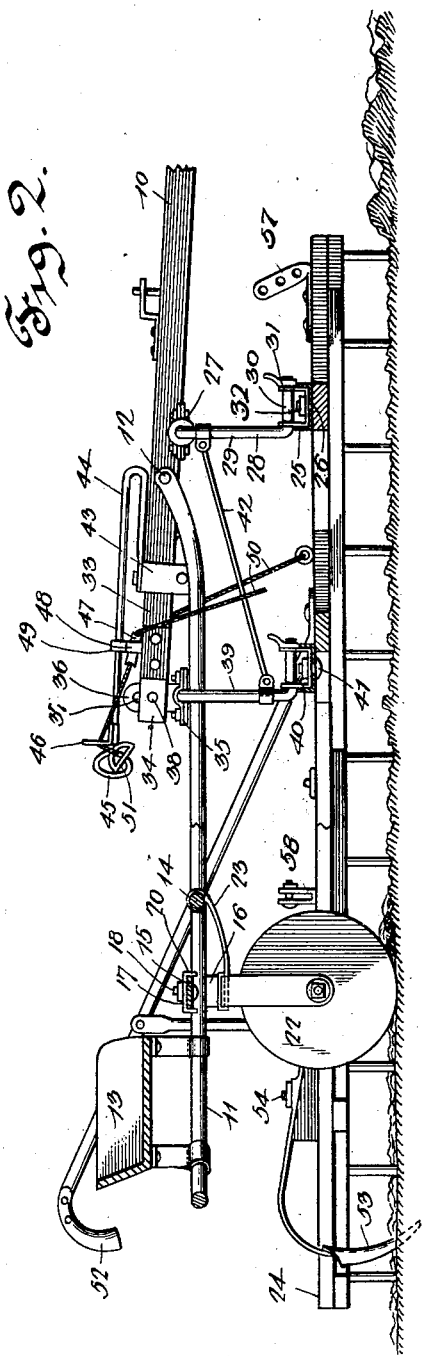
Witnesses Jacob Stout, Inventor.
By C. A. Snow & Co.
Attorneys

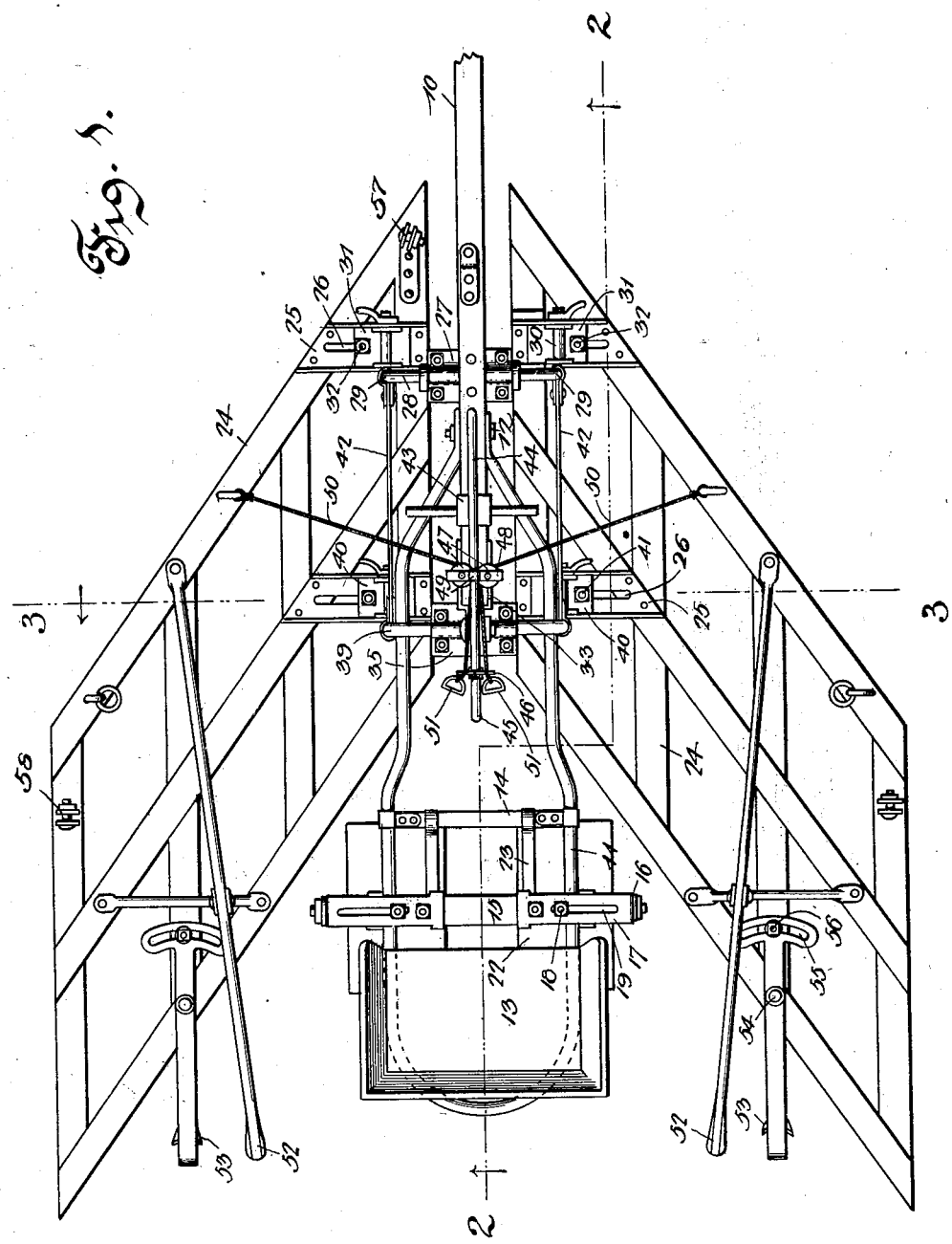

UNITED STATES PATENT OFFICE.

JACOB STOUT, OF BLUFFTON, INDIANA.

COMBINED HARROW AND ROLLER.

SPECIFICATION forming part of Letters Patent No. 699,257, dated May 6, 1902.

Application filed January 24, 1901. Serial No. 44,594. (No model.)

*To all whom it may concern:*

Be it known that I, JACOB STOUT, a citizen of the United States, residing at Bluffton, in the county of Wells and State of Indiana, have invented a new and useful Combined Harrow and Roller, of which the following is a specification.

My invention is an improved combined harrow and roller; and it consists in the peculiar construction and combination of devices hereinafter fully set forth and claimed.

The object of my invention is to provide an improved machine which is adapted for harrowing plowed land and for simultaneously opening furrows therein for the planting of corn or other seeds and which is adapted for cultivating a growing crop and simultaneously rolling the land on opposite sides of the row of growing plants to retain the moisture in the soil next to the row for ridding the land of weeds.

A further object of my invention is to effect improvements in the standards in which the rollers are mounted and in the connections between said standards and the tongue, so that the rollers may be adjusted laterally toward and from each other and set at any required distance apart.

A further object of my invention is to effect improvements in the means for raising and lowering the frames on opposite sides of the tongue.

In the accompanying drawings, Figure 1 is a top plan view of a combined harrow, cultivator, furrow-opener, weeder, and roller embodying my invention. Fig. 2 is a longitudinal sectional view taken on the plane indicated by the line 2 2 of Fig. 1. Fig. 3 is a vertical transverse sectional view taken on a plane indicated by the line 3 3 of Fig. 1. Fig. 4 is a detail perspective view of the standard-frames and their connections for the rollers.

In the embodiment of my invention I provide a draft pole or tongue 10. A U-shaped seat-supporting bar 11 has the front ends of its side arms pivotally connected to the tongue 10, as at 12. The seat 13 is mounted on the rear end of said U-shaped bar, as shown.
The cross-bar 14 connects the side arms of bar 11 at a suitable distance from the rear end thereof. A transverse bridge-bar 15 is disposed astride of the side arms of frame 11 at a suitable distance in rear of the cross-bar 14. Standard-frames 16 have horizontally-disposed inwardly-extending arms 17 on their upper sides, which bear upon and are adjustable on the bridge-bar 15 and are connected to the latter by bolts 18, which operate in slots 19, with which said arms 17 and bridge-bar are provided. Said arms and bridge-bar are further provided with vertically-disposed engaging lugs 20 21, respectively, which strengthen the connection between the standard-frames and the bridge-bar. By this construction the standard-frames may be adjusted laterally and disposed at any required distance apart. In each of the standard-frames is mounted a roller 22. Said rollers operate on the soil on opposite sides of the tongue in rear thereof. Said standard-frames are each provided with a forwardly-extending strap 23. The front ends of the said straps are connected to and are adjustable on the cross-bar 14.

In connection with the tongue I employ a pair of obliquely-disposed rearwardly-extending frames 24, which are adapted for the attachment of harrow-teeth, cultivating teeth or shovels, or suitable implements for cutting off, uprooting, or otherwise destroying weeds. The said frames are provided on their inner sides near their front and rear ends with transversely-disposed parallel adjusting-plates 25, which are provided with slots 26. A clip 27 is connected to the under side of the tongue at a suitable distance from the rear end thereof and is disposed at right angles thereto. In the said clip is pivoted the upper portion of a U-shaped yoke 28, which is provided with vertical depending arms 29 and forwardly-extending horizontal arms 30 at the lower ends thereof. The said arms 30 are pivoted in bearings formed in plates or blocks 31, which are disposed on the adjusting-plates 25 and are secured thereto by bolts 32, which operate in the slots 26. A pair of straps 33 are bolted to opposite sides of the tongue at the rear end thereof, the rear ends of said straps projecting in rear of the tongue, as at 34. A clip 35 is provided on its upper side at its center with a vertical standard 36, which has a vertical adjusting-slot 37. Said standard is secured between the ends 34 of straps 33 by a bolt or pin 38, which engages the adjustingopenings 37. A yoke 39, which is identical in construction with the yoke 28, is secured to the clip 35 and is connected to the adjusting-plates 25 near the rear sides of frames 24 by plates or blocks 40 and adjusting-bolts 41, the latter operating in the slots 26 of said rear adjusting-plates 25.

From the foregoing it will be understood that the frames 24 are connected to the tongue, disposed on opposite sides thereof, are adapted to be laterally adjusted toward and from each other and set at any required distance apart, and are further adapted to be raised and lowered, the horizontal arms 30 of the yokes 28 39 forming the pivots on which said frames turn when being raised and lowered. It will be further understood that the tongue may be readily adjusted and set at any required inclination to cause the teeth or shovels attached to the frame 24 to operate as deeply in the soil as may be desired. The vertical arms of the yokes 28 39 are connected together by brace-rods 42.

A clip 43 is longitudinally movable on the rear portion of the tongue 10, and to the said clip is attached a longitudinally-movable rearwardly-extending elevating-rod 44, which has a handle 45 formed at its rear end and is provided with cleats 46. A pair of sheaves 47 are mounted in a transversely-disposed frame 48 on the upper side of the tongue near the rear end thereof, and the said frame 48 is provided with a clip 49, which engages the rod 44 and forms a guide and support for said rod. An operating cord or chain 50 is attached to each of the frames 24 at a suitable distance from the outer side thereof. Said cords pass over the sheaves 47, and to the rear ends thereof are attached handles 51, which are adapted to engage the clips 46, and thereby attach said cords to the elevating-rod 44. By this construction either of the frames 24 may be raised or lowered independently of the other by drawing rearward on the elevating-cord attached to said frame. When it is desired to raise and lower the said frames 24 simultaneously, this may be done by drawing the elevating-rod 44 rearward or pushing the same forward, said rod by being connected to the elevating-cords of the frames 24 by the cleats 46 and handles 51 serving to operate said elevating-cords simultaneously, as will be understood.

Each of the frames 24 may be provided with a handle 52, and thereby the said frames may be operated by a plowman, who walks in rear of the machine when it is desired to use the same as a walking-harrow.

To each of the frames 24 is detachably secured a furrow-opener 53, which is pivoted to the rear side of the frame at a suitable distance from the outer side thereof by a bolt 54 and has at the front end of its beam or arm a laterally-extending adjusting-slot 55, which is concentric with the pivotal bolt 54 and is engaged by an adjusting-bolt 56. Thereby the furrow-opening shares or shovels may be laterally adjusted toward or from each other to cause the same to open furrows for the planting of seeds at any desired distance apart. It will be understood that when these furrow-openers are used in connection with the frames 24 and the latter are provided with harrow-teeth my invention is adapted for use both as a harrow and as a furrow-opener, so that the operations of harrowing and laying off the land may be performed simultaneously. When thus employed, as shown in Fig. 1, the rollers 22 are usually removed.

By removing the furrow-openers 53 my invention, when organized as shown in Fig. 1 and hereinbefore described, is adapted for use in cultivating between the rows of growing plants, the frames 24 operating on opposite sides of a row of plants and serving to stir the soil between the rows. When the plants are very small, the frames are preferably provided with harrow-teeth when the machine is thus used. As the plants increase in size and strength suitable bull-tongues or cultivating-shovels may be substituted for the harrow-teeth. The rollers may be employed or not in connection with the frame for cultivating the growing crop. When employed, they operate on opposite sides of a row of plants and in rear of the frames 24 and serve to compress the soil contiguous to the plants to enable the same to retain moisture and exclude air from the roots of the plants, and thus promote their growth. It will be understood that the rollers, as well as the frames 24, by being adjustable laterally may be caused to operate at any desired distance from the row.

By employing suitable plows or shovels in connection with the frames 24 my invention may be used for destroying weeds between the rows of growing plants and for preparing a field from which a crop, as of corn, has been harvested for seeding to wheat or other grain.

Having thus described my invention, I claim—

1. The combination of a tongue, a seat-supporting bar connected thereto and extending rearward therefrom, standard-frames connected to said seat-supporting bar, rollers having their bearings in said standards and frames adapted for the attachment of suitable implements for operating in the soil, said frames being connected to and disposed on opposite sides of the tongue, substantially as described.

2. The combination of a tongue, rollers connected to the rear end thereof, a pair of frames pivotally connected to and laterally adjustable toward and from the tongue, whereby said frames may be set at any required distance apart, said frames being provided with suitable implements for operating in the soil, an elevating-rod connected to the tongue and elevating-cords attached to said frames and detachably connected to said elevating-rod, whereby said frames may be raised or lowered independently of each other or simultaneously, substantially as described.

3. The combination of a tongue, a seat-supporting frame extending from the rear end thereof, laterally-adjustable standard-frames connected to said seat-supporting frame, rollers mounted in said standard-frames and frames attached to and disposed on opposite sides of said tongue in advance of said rollers, said frames being adapted for the attachment thereto of suitable implements for operating in the soil, substantially as described.

4. The combination of a pair of frames of the character described, yokes connecting the same together, a tongue pivotally attached to the front yoke and adjustably secured to the rear yoke, whereby said tongue may be disposed at any desired inclination, a frame pivotally connected to and extending in rear of said tongue, and supporting-rollers for said frame, substantially as described.

In testimony that I claim the foregoing as my own I have hereto affixed my signature in the presence of two witnesses.

JACOB STOUT.

Witnesses:
M. A. STOUT,
RAY R. STURGIS.